United States Patent
Weder

[19]

[11] Patent Number: 6,065,601

[45] Date of Patent: May 23, 2000

[54] LINER WITH NATURAL GRASS TUFT

[75] Inventor: Donald E. Weder, Highland, Ill.

[73] Assignee: Southpac Trust International, Inc.

[21] Appl. No.: 09/343,925

[22] Filed: Jun. 30, 1999

Related U.S. Application Data

[60] Provisional application No. 60/093,954, Jul. 23, 1998.

[51] Int. Cl.⁷ .................................................... B65D 73/00
[52] U.S. Cl. .............................. 206/457; 206/594; 47/56; 47/65.9
[58] Field of Search ..................... 206/457, 584, 206/594; 47/9, 26, 41.1, 41.12, 56, 65.5, 65.9, 67, 66.7, 75

[56] References Cited

U.S. PATENT DOCUMENTS

| | | | |
|---|---|---|---|
| 2,038,019 | 4/1936 | Wright | 47/9 |
| 2,233,032 | 2/1941 | Robinson | 47/34 |
| 2,785,969 | 3/1957 | Clawson | 71/64 |
| 3,154,884 | 11/1964 | Amar et al. | 47/1 |
| 3,958,365 | 5/1976 | Proctor | 47/34 |
| 3,961,444 | 6/1976 | Skaife | 47/65.9 |
| 4,163,343 | 8/1979 | Schoenfield | 47/66 |
| 4,190,981 | 3/1980 | Muldner | 47/56 |
| 5,199,215 | 4/1993 | Lopez | 47/56 |
| 5,401,281 | 3/1995 | Chamoulaud | 47/56 |
| 5,417,010 | 5/1995 | Ecer | 47/56 |
| 5,906,280 | 5/1999 | Weder | 206/584 |
| 5,946,854 | 9/1999 | Guillemain et al. | 47/65.9 |

OTHER PUBLICATIONS

"Ready–To–Grow Perennial Flower Mats"; Supermarket Floral—Jul. 1994; p. 28.

*Primary Examiner*—David T. Fidei
*Attorney, Agent, or Firm*—Dunlap, Codding & Rogers, P.C.

[57] ABSTRACT

A container liner comprising a waterproof backing, a porous covering, a seed carrier interposed between the backing and the covering, and a plurality of seeds embedded in the seed carrier such that upon germination the seeds will sprout through the porous covering to form a soft, natural, protective cushion for objects, such as candies or Easter eggs. The container liner is sufficiently flexible so that the container liner can be easily manipulated to substantially conform to the interior contour of the container.

28 Claims, 4 Drawing Sheets

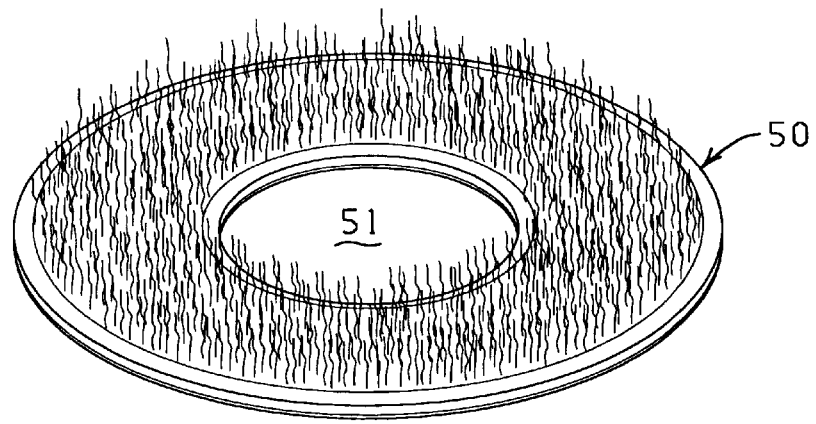
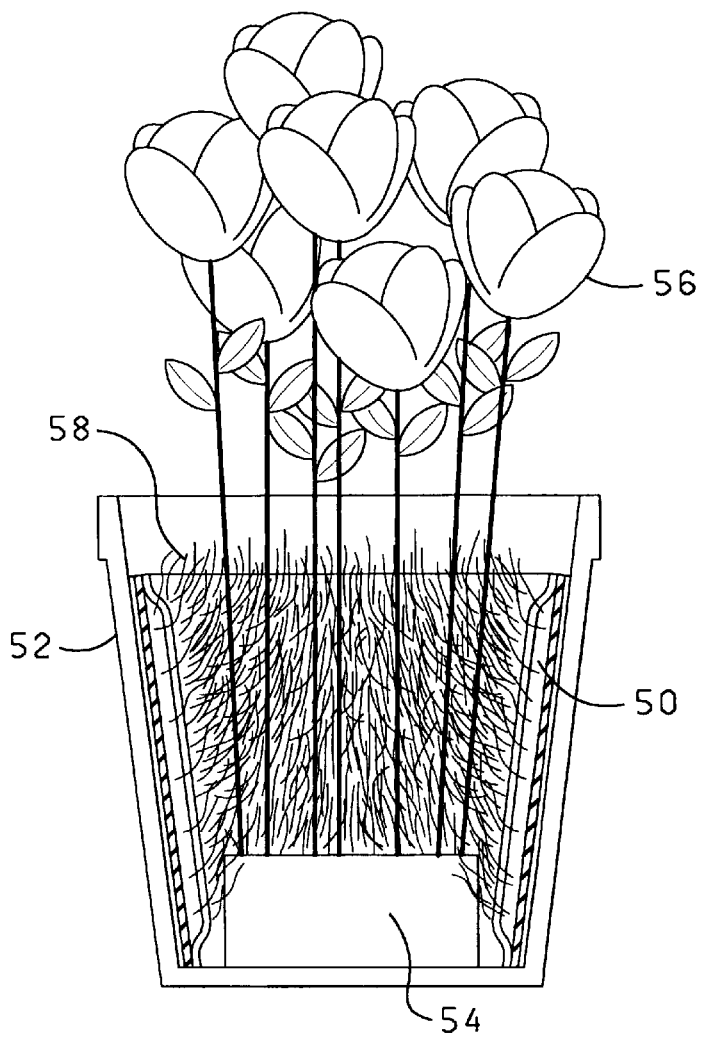

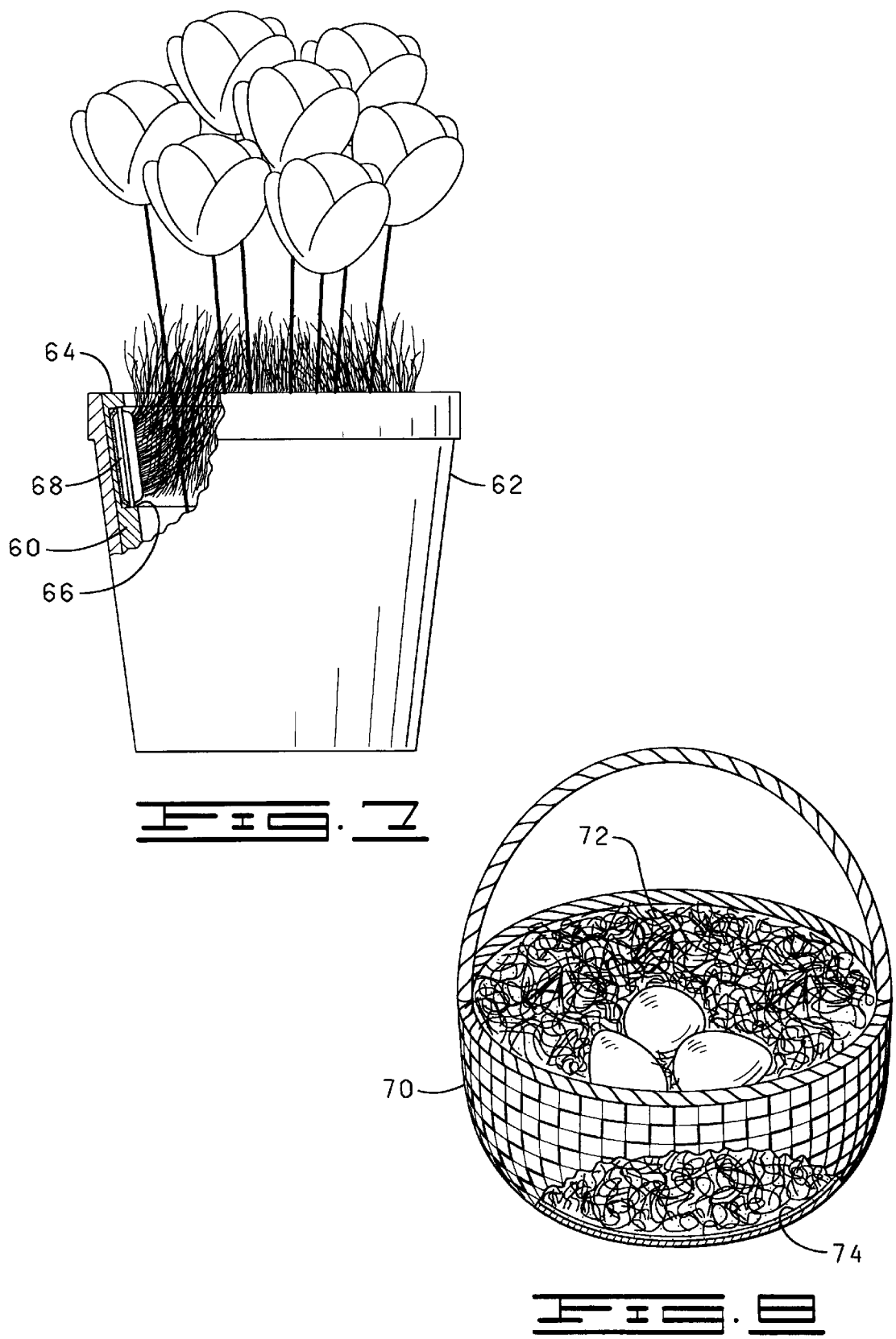

6,065,601

LINER WITH NATURAL GRASS TUFT

CROSS REFERENCE TO RELATED APPLICATIONS

This application claims the benefit of U.S. Provisional Application Serial No. 60/093,954, filed Jul. 23, 1998.

BACKGROUND OF THE INVENTION

1. Field of the Invention

The present invention relates generally to liners, and more particularly, but not by way of limitation, to a liner having a natural grass tuft to provide a unique decorative appearance and cushioning support.

2. Brief Description of the Related Art

Strips of sheet material formed into tufts have been used for many years. More specifically, material known as decorative grass has been used in fruit baskets, Easter baskets, picnic baskets and other containers and receptacles for decorative and cushioning purposes. The decorative grass of the prior art has been produced by numerous methods and from a variety of materials such as polymeric materials, paper, cellophane or the like. Typically, such materials are cut and shredded to produce individual segments having predetermined dimensions.

A problem associated with decorative grass is that it can easily fall out of the container in which it is disposed or cling to other objects, and therefore is inconvenient to clean up and to dispose of. In addition, because of the materials from which decorative grasses are typically fabricated, decorative grasses generally have an artificial appearance.

To this end, a liner is desired that provides an effective cushioning support while having a natural appearance. It is to such a liner that the present invention is directed.

SUMMARY OF THE INVENTION

The present invention is directed to a liner for a container. The liner includes a flexible, waterproof sheet of material having a first side and a second side, the first side having a bonding material disposed thereon. A flexible, porous sheet of material is connected to the second side of the flexible, waterproof sheet of material in a superposed relationship. A flexible seed carrier is disposed between the flexible, waterproof sheet of material and the flexible, porous sheet of material. The seed carrier is fabricated of a moisture retaining material. Finally, a plurality of seeds are embedded in the seed carrier such that, upon germination, the seeds will sprout through the flexible porous sheet of material so as to form a natural tuft.

In another aspect, the present invention is directed to a combination of a container and the liner noted above wherein the liner is bonded to the interior surface of the container.

The objects, features and advantages of the present invention will become apparent from the following detailed description when read in conjunction with the accompanying drawings and appended claims.

BRIEF DESCRIPTION OF THE SEVERAL VIEWS OF THE DRAWING

FIG. 5 a perspective view of another embodiment of a liner constructed in accordance with the present invention.

FIG. 6 is a sectional view of the liner of FIG. 5 shown disposed in a basket.

FIG. 7 is a partially cutaway, elevational view of another embodiment of a liner constructed in accordance with the present invention shown disposed in a container.

FIG. 8 is a partially cutaway, perspective view of a basket constructed in accordance with the present invention shown with a quantity of decorative grass disposed therein.

DETAILED DESCRIPTION OF THE INVENTION

Figure 1:
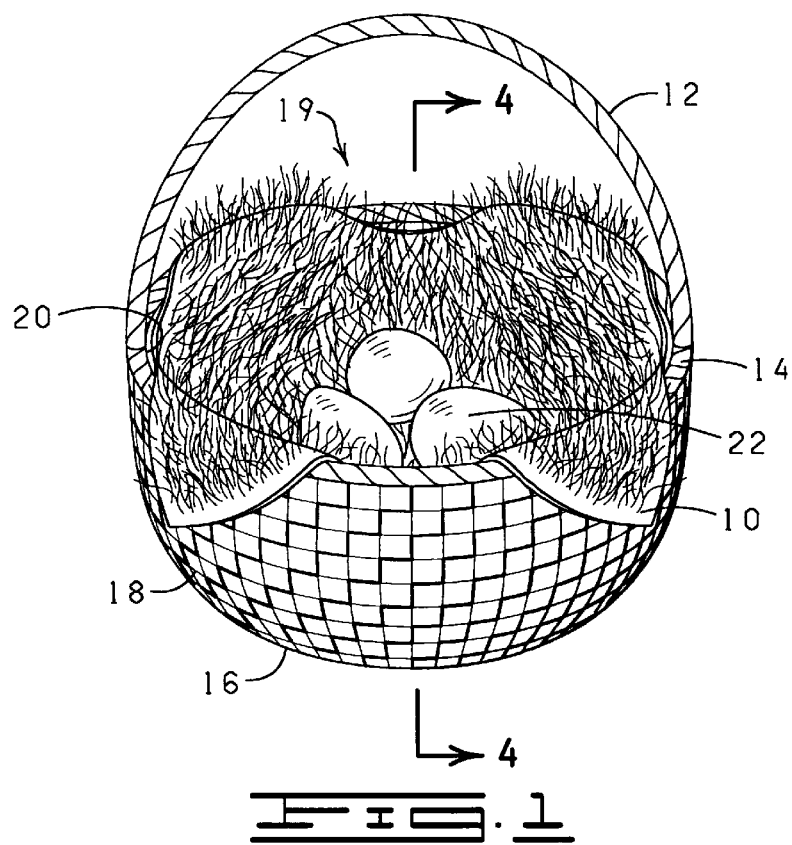
FIG. 1 is a perspective view of a basket having a liner constructed in accordance with the present invention disposed therein.

Referring now to the drawings, and more specifically to FIG. 1, a liner 10 constructed in accordance with the present invention is shown disposed in a container, such as a basket 12. The basket 12 has an upper end 14, a lower end 16, and an outer surface 18. An opening 19 is formed in the basket 12, with a portion of the basket opening 19 intersecting the upper end 14 of the basket 12 forming an inner surface 20. The basket opening 19 is sized and shaped to receive a plurality of objects 22, such as candies or Easter eggs, for display. It will be appreciated that the liner 10 described below is not limited to being used with Easter baskets, but can be used to line fruit baskets, picnic baskets, as well as other containers and receptacles.

Figure 2:
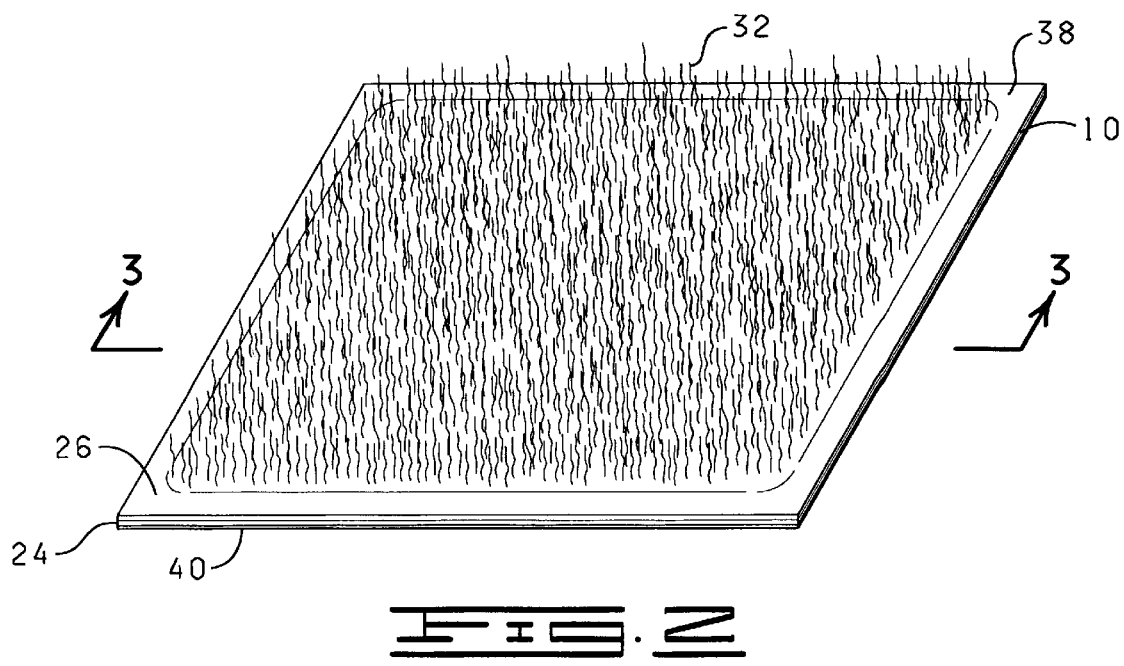
FIG. 2 is a perspective view of the liner of the present invention.
Figure 3:
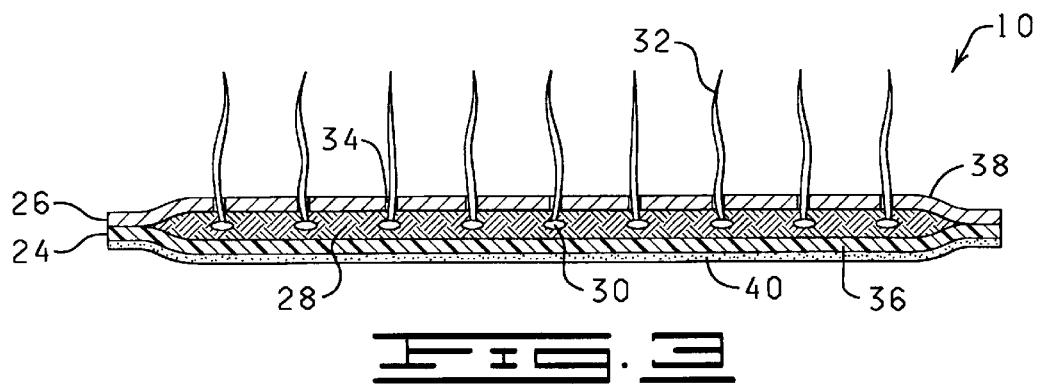
FIG. 3 is a cross-sectional view taken along line 3—3 in FIG. 2.

Referring to FIGS. 2 and 3, the liner 10 includes a waterproof backing 24, a porous covering 26, a seed carrier 28 (FIG. 3) interposed between the backing 24 and the covering 26, and a plurality of seeds 30 (FIG. 3) embedded in the seed carrier 28, such that upon germination, the seeds 28 will sprout through the porous covering to form a soft, natural, cushioning tuft 32. The liner 10 is sufficiently flexible so that the liner 10 can be easily manipulated to substantially conform to the interior contour of the basket 12.

The seeds 30 can be any seed or a combination of seeds. However, winter wheat seeds have been found to be a suitable seed in that winter wheat seeds tend to sprout within about three to four days after being exposed to moisture, and produce a thin dark green blade. In addition, such blades are relatively rigid enabling them to remain substantially erect up to a height of about three to four inches and thereby provide a soft, natural, protective cushion for objects displayed in the basket 12. Rye seeds are also preferable seeds for the purpose of this invention.

Alternatively, plant material that is capable of being stored for long periods of time in a dry condition and which becomes rejuvenated upon exposure to moisture can be implanted in the seed carrier 28. An example of such a plant is selaginella lepidophylla, or more commonly referred to as the dinosaur plant.

The seed carrier 28 is fabricated of a material capable of holding moisture to the seeds 30 to foster germination and subsequent growth. Any material capable of holding the seeds and retaining moisture may be utilized. For example, the seed carrier 28 may be fabricated of a sponge material, a tissue, a cloth, a gel, soil, or the like.

The backing 24 serves as a barrier to prevent moisture in the seed carrier 28 from leaking into the basket 12. To this end, the backing 24 is constructed of a flexible, waterproof sheet of material, such as a polymer film. The term "polymer film" as used herein means a synthetic polymer such as a polypropylene or a naturally occurring polymer such as cellophane. The backing 24 may be constructed of a single layer of material or a plurality of layers of the same or different types of materials. Any thickness of the backing 24 may be utilized in accordance with the present invention.

The covering 26 serves to hold the seeds 30 in position and permit the seeds 30 to emit their sprouts. The covering 26 can be any suitable porous sheet material, such as cloth with a course weave or with openings formed therein, or a piece of film or paper or other flexible material provided with openings 34 to permit the seeds to emit their sprouts.

In assembly, the seed carrier 28, together with the seeds 30, is encased between the backing 24 and the covering 26 with the seeds 30 positioned to permit the sprouts of the seeds 30 to grow up through the openings 34 of the covering 26. The backing 24 and the covering 26 are secured to one another along the periphery in a suitable fashion such as by bonding the backing and the covering together with an adhesive or stitching.

In an assembled condition, the backing 24 defines a lower surface 36 of the liner 10 and the covering 26 defines an upper surface 38. Further, the liner 10 is illustrated herein as having a square configuration. However, it will be appreciated that the liner 10 can be formed into any other desired geometric shape, such as circular, triangular, or rectangular.

The backing 24 and the covering 26 of the liner 10 may vary in color. Further, each may consist of designs which are printed, etched, and/or embossed. In addition, the backing and the covering may have various colorings, coatings, flocking and/or metallic finishes, or be characterized totally or partially by pearlescent, translucent, transparent, or the like, qualities. Each of the above-named characteristics may occur alone or in combination. Moreover, each of the backing 24 and the covering 26 may vary in the combination of such characteristics.

A bonding material 40 may be disposed on the lower surface 36 of the liner 10. The bonding material 40 covers substantially the entire lower surface 36 of the liner 10. The bonding material 40 is disposed on the lower surface 36 of the liner 10 by spraying or painting it thereupon.

The bonding material 40 imparts sufficient adhesion to permit the liner 10 to be disposed in the basket opening 19 with the lower surface 36 of the liner 10 disposed adjacent the inner surface 20 of the basket 12 so that the bonding material 40 on the lower surface 36 of the liner 10 contacts the inner surface 20 of the basket 12 for connecting the liner 10 to the inner surface 20 of the basket 12. The bonding material 40 also causes the liner to conform to the contour of the inner surface 20 of the basket 12. That is, the lower surface 36 of the liner 10 adheres to the inner surface 20 of basket 12 and it adheres to overlapping portions of itself. In this manner, a customized fit of the liner to the inner surface 20 of the basket 12 is obtained. The liner 10 is preferably sized to that when the liner 10 is placed inside the basket 12, the liner 10 covers substantially the entire inner surface 20 of the basket 12.

The term "bonding material" when used herein means an adhesive, frequently a pressure sensitive adhesive, or a cohesive or any adhesive/cohesive combination, having adhesive qualities (i.e., qualities of adhesion or adhesion/cohesion, respectively) sufficient to effect the connection between the lower surface 36 of the liner 10 brought into engagement with the basket 12, a box or other container. It will be appreciated that both adhesives and cohesives are well known in the art, and both are commercially available.

The bonding material 40 may also comprise at least one strip of bonding material 40 extending over the lower surface 36 of the liner 10. Alternatively, the bonding material 40 may comprise at least one spot of bonding material 40 extending over the lower surface 36 of the liner 10. The bonding material 40 may comprise a variety of designs, both geometric and fanciful (for example, hearts, flowers, slogans, and the like). The bonding material 40 may also comprise a variety of colors.

The bonding material 40 on the lower surface 36 of the liner 10 may be covered with at least one release strip (not shown). The release strip is used to protect the bonding material 40 before the lower surface 36 of the liner 10, and the bonding material 40 thereon, is disposed adjacent the inner surface 20 of the basket 12.

A plurality of liners 10 can be stacked and formed into a pad. Also, the liners 10 can be formed into a roll of material. In this instance, an elongated liner would be perforated so as to define individual liners, rather than cut completely, so that the individual liners 10 remain connected to one another and yet can be easily separated from an adjacent liner when desired.

Figure 4:
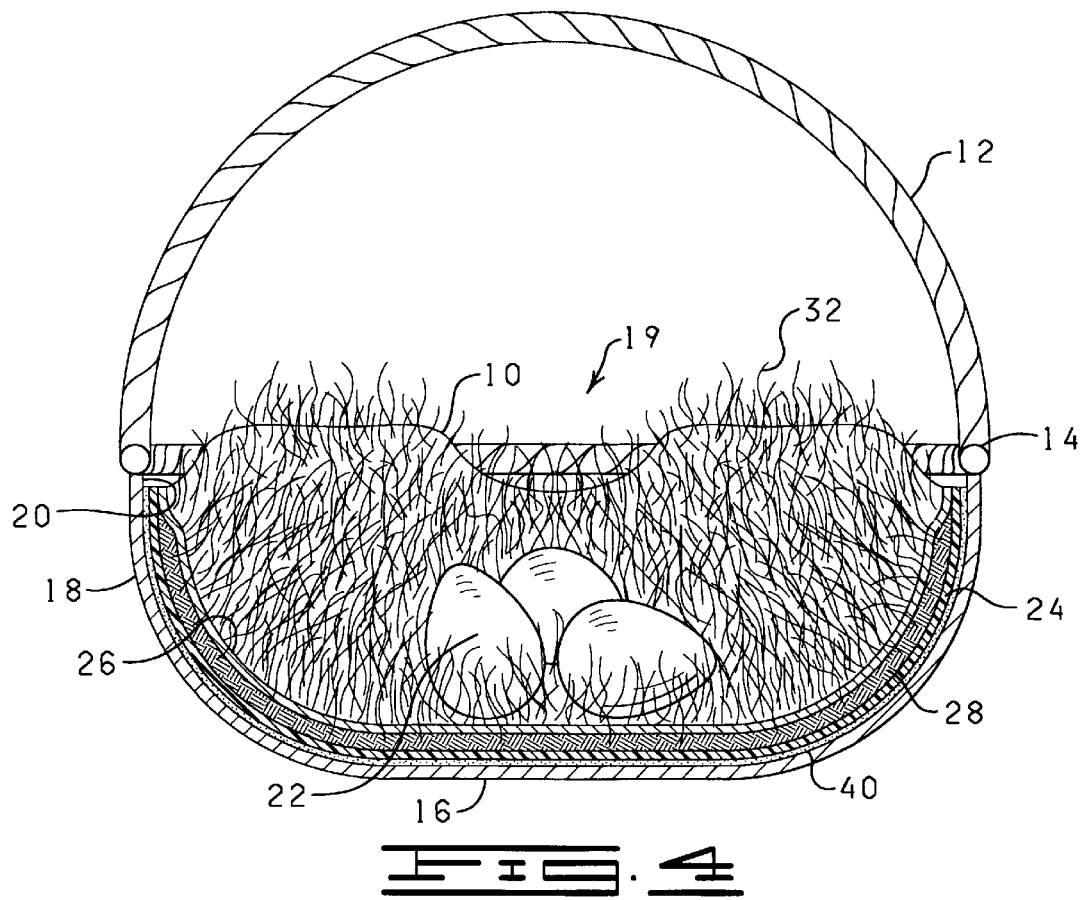
FIG. 4 is a cross-sectional view taken along line 4—4 in FIG. 1.

Referring now to FIGS. 1 and 4, the liner 10 is shown disposed in the basket 12. The seeds 30 are activated by exposing the seed carrier 28 to moisture. The seed carrier 28 can be exposed to moisture in any suitable fashion, such as submerging the entire liner 10 in a body of water or applying water to the porous covering 26 only. The liner 10 is next positioned in a container, such as the basket 12, so as to line the interior surface 20 of the container. After several days the seeds 30 will emit their sprout from the covering 26 whereby the soft, natural, cushioning tuft 32 is formed in the basket 12. In the alternative to placing the liner 10 in the basket 12 immediately after the seed carrier 28 has been exposed to moisture, the liner 10 can be set aside to permit the seeds 30 to sprout prior to the liner 10 being positioned in the basket 12.

In positioning the liner 10 in the basket 12, the liner 10 is placed through the basket opening 19 in the upper end 14 of the basket 12 with the lower surface 36 of the liner 10 disposed adjacent the inner surface 20 of the basket 12. The liner 10 is shaped to substantially conform to the contour of the inner surface 20 of the basket 12. Unless the liner 10 is precisely sized to fit the inner surface 20 of the basket 12, overlapping folds (not shown) are formed in the liner 10. The overlapping folds extend at different angles and over different lengths.

In the case where the liner 10 is provided with the bonding material 40, the release strip (not shown) is removed from the lower surface 36 of the liner 10. Then, the liner 10 is placed through the basket opening 19 in the upper end 14 of the basket 12 with the lower surface 36 of the liner 10 having the bonding material 40 thereon disposed adjacent the inner surface 20 of the basket 12. The liner 10 is spread over the inner surface 20 of the basket 12 to permit the bonding material 40 on the lower surface 36 of the liner 10 to contact the inner surface 20 of the basket 12, bondably connecting the liner 10 to the inner surface 20 of the basket 12. The connections of the liner 10 to like portions thereof due to the formation of the overlapping folds and to the inner surface 20 of the basket 12 produce a customized fit of the liner 10 to the inner surface 20 of the basket 12.

FIG. 5 shows another embodiment of a liner 50 constructed in accordance with the present invention. The liner 50 is similar in construction to the liner 10 described above, with the exception that the liner 50 is shown to have a circular configuration and a central opening 51 extending therethrough.

FIG. 6 illustrates the liner 50 disposed in a container, such as a flower pot 52. The central opening 51 of the liner 50 provides the advantage of allowing the liner 50 to be inserted into the flower pot 52 so as to line the interior surface of the flower pot 52 while maintaining the bottom of the flower pot 52 unobstructed. As such, use of the liner 50 facilitates the positioning of a floral holding material, such as a block 54 of floral foam, which is adapted to support a floral grouping 56. The term "floral grouping" is used herein to mean cut and fresh flowers, artificial flowers, a single flower, other fresh and/or artificial plants, or other floral materials. The term "floral grouping" may also include other secondary plants and/or ornamentation which add to the aesthetics of the overall floral grouping.

The liner 50 is positioned in the flower pot 52 to line the interior walls of the flower pot 52. The seeds of the liner 50 will emit their sprouts whereby a natural tuft 58 is provided in the flower pot 52. The tuft 58 will accentuate the aesthetics of the floral grouping 56. It will be appreciated that other objects such as Easter eggs, potted plants, or toys can be accentuated by the tuft 58 of the liner 50.

FIG. 7 shows another embodiment of a liner 60 disposed in a flower pot 62. The liner 60 includes a preformed liner portion 64 which is sized and shaped to be received in the flower pot 62. The liner portion 64 is fabricated of a polymeric material which is thermal or vacuum formed or injection or blow molded so as to have a substantially rigid quality. The liner portion 64 can be formed to have an internal annular groove 66, preferably near the upper end thereof. The annular groove 66 is adapted to receive an insert 68 which is similar in configuration to the ring-shaped liner 50 shown in FIGS. 5 and 6. The inserts 68 are secured in the groove 66 whereby the inserts 68 may be periodically removed and a new insert positioned within the groove 66 when desired. Again, the natural tuft of the insert 68 will serve to accentuate the aesthetics of a floral grouping disposed in the liner 60 or to support objects disposed in the liner 60.

Referring now to FIG. 8, a container, such as a basket 70, is shown with a quantity of decorative grass 72 disposed therein. As mentioned above, decorative grass, also known as Easter grass, is well known and has been produced by numerous methods and from a variety of materials such as polymeric materials, paper, cellophane or the like. Typically, such materials are cut and shredded to produce individual segments having predetermined dimensions. As also mentioned above, a problem associated with decorative grass is that it can easily fall out of the container in which it is disposed or cling to other objects, and therefore is inconvenient to clean up and to dispose of.

To overcome this problem, the interior of the basket 70 is coated with a bonding material 74. As such, when the decorative grass 72 is disposed in the basket 70 in contact with the interior surface of the basket 70, the decorative grass 72 is caused to bondably connect to the interior surface of the basket 70. By connecting the decorative grass 72 to the interior surface of the basket 70, the decorative grass 72 is prevented from falling out of the basket 70.

The bonding material 74 may be applied to the interior surface of the basket in a conventional manner. In addition, a release strip may be applied to the bonding material 74 to protect the bonding material 74 prior to placing the decorative grass 72 in contact with the bonding material 74.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed:

1. A liner for a container, comprising:
    a flexible, waterproof sheet of material having a first side and a second side, the first side having a bonding material disposed thereon;
    a flexible, porous sheet of material connected to the second side of the flexible, waterproof sheet of material;
    a flexible seed carrier disposed between the flexible, waterproof sheet of material and the flexible, porous sheet of material, the seed carrier fabricated of a moisture retaining material; and
    a plurality of seeds embedded in the seed carrier such that, upon germination, the seeds will sprout through the flexible porous sheet of material so as to form a natural tuft.

2. The liner of claim 1 wherein the waterproof material is a film.

3. The liner of claim 1 wherein the porous material is a film provided with a plurality of perforations.

4. The liner of claim 1 wherein the porous material is a cloth.

5. The liner of claim 1 wherein the seed carrier is a spongy cellulose material.

6. The liner of claim 1 wherein the seed carrier is a gel.

7. The liner of claim 1 wherein the seeds are winter wheat.

8. The liner of claim 1 wherein the seeds are fern seeds.

9. The liner of claim 1 further comprising a central opening extending therethrough.

10. The liner of claim 1 wherein the bonding material is an adhesive.

11. A container in combination with a liner for lining an interior surface of the container, the liner comprising:
    a flexible, waterproof sheet of material having a first side and a second side;
    a flexible, porous sheet of material connected to the second side of the flexible, waterproof sheet of material; and
    a plurality of seeds embedded between the flexible, waterproof sheet of material and the flexible, porous sheet of material such that, upon germination, the seeds will extend through the flexible porous sheet of material so as to form a natural tuft in the container.

12. The combination of claim 11 wherein the waterproof sheet of material is bondably connected to the interior of the container.

13. The combination of claim 11 wherein the waterproof material is a film.

14. The combination of claim 11 wherein the porous material is a film provided with a plurality of perforations.

15. The combination of claim 11 wherein the porous material is a cloth.

16. The combination of claim 11 wherein the seeds are embedded in a flexible seed carrier disposed between the flexible, waterproof sheet of material and the flexible, porous sheet of material, the seed carrier fabricated of a moisture retaining material.

17. The combination of claim 16 wherein the seed carrier is a spongy cellulose material.

18. The combination of claim 16 wherein the seed carrier is a gel.

19. The combination of claim 11 wherein the seeds are winter wheat.

20. The combination of claim 11 wherein the seeds are fern seeds.

21. The combination of claim 11 further comprising a central opening extending therethrough.

22. The combination of claim 21 further comprising:
a floral holding material disposed within the central opening of the liner whereby the liner extends about the floral holding material.

23. The combination of claim 11 wherein the bonding material is an adhesive.

24. A liner, comprising:
a preformed liner portion sized and shaped to be received in a container, the liner portion having a substantially rigid quality; and
an insert secured to the liner portion, the insert comprising:
  a backing having a first side and a second side;
  a porous covering connected to the second side of backing;
  a flexible seed carrier disposed between the backing and the covering, the seed carrier fabricated of a moisture retaining material; and
  a plurality of seeds embedded in the seed carrier such that, upon germination, the seeds will sprout through the covering so as to form a natural tuft.

25. The liner of claim 24 wherein the insert is secured to the liner portion with a bonding material provided on the first side of the backing of the insert.

26. The liner of claim 24 wherein the liner portion is provided with a groove into which the insert is positioned.

27. The liner of claim 26 wherein the insert is secured to the liner portion with a bonding material provided on the first side of the backing of the insert.

28. A package, comprising:
a container having an interior surface and an exterior surface with a bonding material applied to at least a portion of the interior surface; and
a mass of randomly arranged individual, thin, flexible strips of material intertwined to form a resilient tuft, the resilient tuft positioned in the container so as to be bondingly connected to the interior surface of the container by the bonding material applied to the interior surface of the container.

* * * * *

UNITED STATES PATENT AND TRADEMARK OFFICE
CERTIFICATE OF CORRECTION

PATENT NO. : 6,065,601
DATED : May 23, 2000
INVENTOR(S) : Donald E. Weder

It is certified that error appears in the above-identified patent and that said Letters Patent is hereby corrected as shown below:

<u>Column 2,</u>
Line 8, delete "basket" and substitute therefor -- container --.

<u>Column 3,</u>
Line 56, delete "to" and substitute therefor -- so --.

Signed and Sealed this

Eighteenth Day of June, 2002

Attest:

Attesting Officer

JAMES E. ROGAN
*Director of the United States Patent and Trademark Office*